US011483736B2

(12) United States Patent
Gao et al.

(10) Patent No.: US 11,483,736 B2
(45) Date of Patent: Oct. 25, 2022

(54) METHODS AND SYSTEM FOR TRANSMITTING A TEMPORARY IDENTIFIER

(71) Applicant: ZTE Corporation, Guangdong (CN)

(72) Inventors: Yuan Gao, Guangdong (CN); Feng Xie, Guangdong (CN); He Huang, Guangdong (CN); Wenting Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/940,849

(22) Filed: Jul. 28, 2020

(65) Prior Publication Data

US 2020/0359260 A1 Nov. 12, 2020

Related U.S. Application Data

(63) Continuation of application No. PCT/CN2018/080887, filed on Mar. 28, 2018.

(51) Int. Cl.
*H04W 28/06* (2009.01)
*H04W 76/11* (2018.01)
*H04W 74/08* (2009.01)

(52) U.S. Cl.
CPC ....... *H04W 28/06* (2013.01); *H04W 74/0833* (2013.01); *H04W 76/11* (2018.02)

(58) Field of Classification Search
CPC ............. H04W 74/0833; H04W 76/11; H04W 74/0841; H04W 28/06; H04L 61/6054; H04L 61/103
See application file for complete search history.

(56) References Cited

U.S. PATENT DOCUMENTS

| 8,406,180 | B2 | 3/2013 | Park et al. |
| 2009/0262681 | A1 | 10/2009 | Park et al. |
| 2010/0067495 | A1 | 3/2010 | Lee et al. |
| 2016/0295398 | A1 | 10/2016 | Ketheesan et al. |
| 2019/0150218 | A1* | 5/2019 | Futaki ............ H04W 4/70 370/329 |
| 2019/0174449 | A1* | 6/2019 | Shan ............ H04W 60/00 |
| 2020/0120742 | A1* | 4/2020 | Mildh ............ H04W 76/27 |
| 2020/0228987 | A1* | 7/2020 | Ben Henda ........ H04W 12/02 |
| 2020/0267539 | A1* | 8/2020 | Tamura ........... H04W 76/27 |
| 2020/0267634 | A1* | 8/2020 | Kim ............. H04W 48/16 |

(Continued)

FOREIGN PATENT DOCUMENTS

| KR | 101384865 B1 | 4/2014 |
| WO | 2007148917 A2 | 12/2007 |
| WO | 2008084949 A1 | 7/2008 |

OTHER PUBLICATIONS

Supplementary European Search Report for EP Patent Application No. 18911922.5, dated Mar. 15, 2021, 6 pages.

(Continued)

*Primary Examiner* — Syed Ali
(74) *Attorney, Agent, or Firm* — Perkins Coie LLP

(57) ABSTRACT

Various implementations of a method for transmitting a temporary identifier involve a wireless communication device: transmitting a first portion of a temporary identifier of the wireless communication device to a radio access network in a first message; and transmitting a second portion of the temporary identifier to the radio access network in a second message.

12 Claims, 4 Drawing Sheets

(56) References Cited

U.S. PATENT DOCUMENTS

| | | | | |
|---|---|---|---|---|
| 2020/0351816 A1* | 11/2020 | Persson | ............ | H04W 74/0833 |
| 2020/0367224 A1* | 11/2020 | Persson | ................ | H04B 7/0695 |
| 2021/0014781 A1* | 1/2021 | Ianev | .................... | H04W 48/18 |
| 2021/0029776 A1* | 1/2021 | Tiwari | .................. | H04W 48/18 |
| 2022/0022121 A1* | 1/2022 | Eklöf | .............. | H04W 36/00837 |
| 2022/0201550 A1* | 6/2022 | Tiwari | .................. | H04W 76/38 |

OTHER PUBLICATIONS

Huawei et al: "On potential issues for signalling Msg3 size", 3GPP Draft; R2-1706464 on Potential Issues for Signalling Msg3 Size, 3rd Generation Partnership Project (3GPP), Mobile Competence Centre; 650, Route Des Lucioles; F-06921 Sophia-Antipolis Cedex; FR vol. RAN WG2, No. Qingdao, China; Jun. 27, 2017-Jun. 29, 2017, Jun. 26, 2017 (Jun. 26, 2017), XP051300970, Retrieved from the Internet: URL:http://www.3gpp.org/ftp/Meetings 3GPP SYNC/RAN2/Docs/ [retrieved on Jun. 26, 2017] 5 pages.

Alcatel-Lucent, "Proposed way forward on Establishment cause values", 3GPP TSG RAN WG2 #62, Kansas City, United States of America, R2-082692, 4 pages, May 2008.

Ericsson, "Message 3.5 in LTE connected to 5GC", 3GPP TSG-RAN WG2 #101, Athens, Greece, R2-1802632, 4 pages, Mar. 2, 2018.

International Search Report and Written Opinion dated Jan. 2, 2019 for International Application No. PCT/CN2018/080887, filed on Mar. 28, 2018 (7 pages).

Oppo, "Discussion UE Identifier Definition in RRC Signalling in eLTE", 3GPP TSG-RAN WG2#101, Athens, Greece, R2-1801776, 4 pages, Mar. 2018.

SA2, "LS on 5G-S-TMSI code space", SA WG2 Meeting #S2-126, Montreal, Canada, S2-182964, 1 page, Mar. 2018.

Ericsson, "Handling of Collision between UE Identifiers in LTE connected to 5GC," 3GPP TSG-RAN WG2 #101, R2-1802631, Athens, Greece, Feb. 26-Mar. 2, 2018, 6 pages.

ZTE, "Consideration on extending the code space for 5G-S-TMSI," 3GPP TSG-RAN WG2 Meeting#101bis, R2-1804461, Sanya, China, Apr. 16-20, 2018, 4 pages.

* cited by examiner

METHODS AND SYSTEM FOR TRANSMITTING A TEMPORARY IDENTIFIER

CROSS REFERENCE TO RELATED APPLICATIONS

This patent document is a continuation of and claims benefit of priority to International Patent Application No. PCT/CN2018/080887, filed on Mar. 28, 2018. The entire content of the before-mentioned patent application is incorporated by reference as part of the disclosure of this application.

TECHNICAL FIELD

The present disclosure is related generally to wireless networks and, more particularly, to methods and systems for transmitting and/or obtaining a temporary identifier.

BACKGROUND

In many current wireless networks (e.g., those of the major wireless carriers), when a user equipment ("UE") attempts to access a radio access network ("RAN") (e.g., after the UE is powered on), one of the first tasks carried out by the UE is to engage in a random access procedure. At the end of the random access procedure, the UE establishes a radio resource control ("RRC") connection with the RAN. In doing so, the UE may identify itself using a temporary UE ID, which allows the core network ("CN") to know who the subscriber is without the necessity of the UE providing the international mobile subscriber identity ("IMSI"), which can compromise the security of the UE. The CN maintains a mapping between the temporary UE ID and the IMSI.

DRAWINGS

While the appended claims set forth the features of the present techniques with particularity, these techniques, together with their objects and advantages, may be best understood from the following detailed description taken in conjunction with the accompanying drawings of which:

DESCRIPTION

The disclosure is generally directed to a method and system for transmitting and receiving a temporary identifier. According to various embodiments, a temporary identifier of a UE is divided into two parts and transmitted from the UE to a node of a RAN via separate messages—one part of the UE temporary identifier in a first message and the other part in a second message.

According to various embodiments, a method for transmitting a temporary identifier involves a wireless communication device: transmitting a first portion of a temporary identifier of the wireless communication device to a radio access network in a first message; and transmitting a second portion of the temporary identifier to the radio access network in a second message.

In an embodiment, the method further includes the device receiving, from the radio access network, a contention resolution message containing the first portion.

One of the first and second messages may be a radio resource control connection request message and a radio resource control connection setup complete message According to various embodiments, the first portion is a plurality of least significant bits of the temporary identifier and the second portion is a plurality of the most significant bits of the temporary identifier.

In an embodiment, the least significant bits include a temporary mobile subscriber identity and an access and mobility management function pointer.

According to an embodiment, the least significant bits include the least significant bits of an access and mobility management function set identifier and the most significant bits include the most significant bits of the access and mobility management function set identifier.

Figure 1:
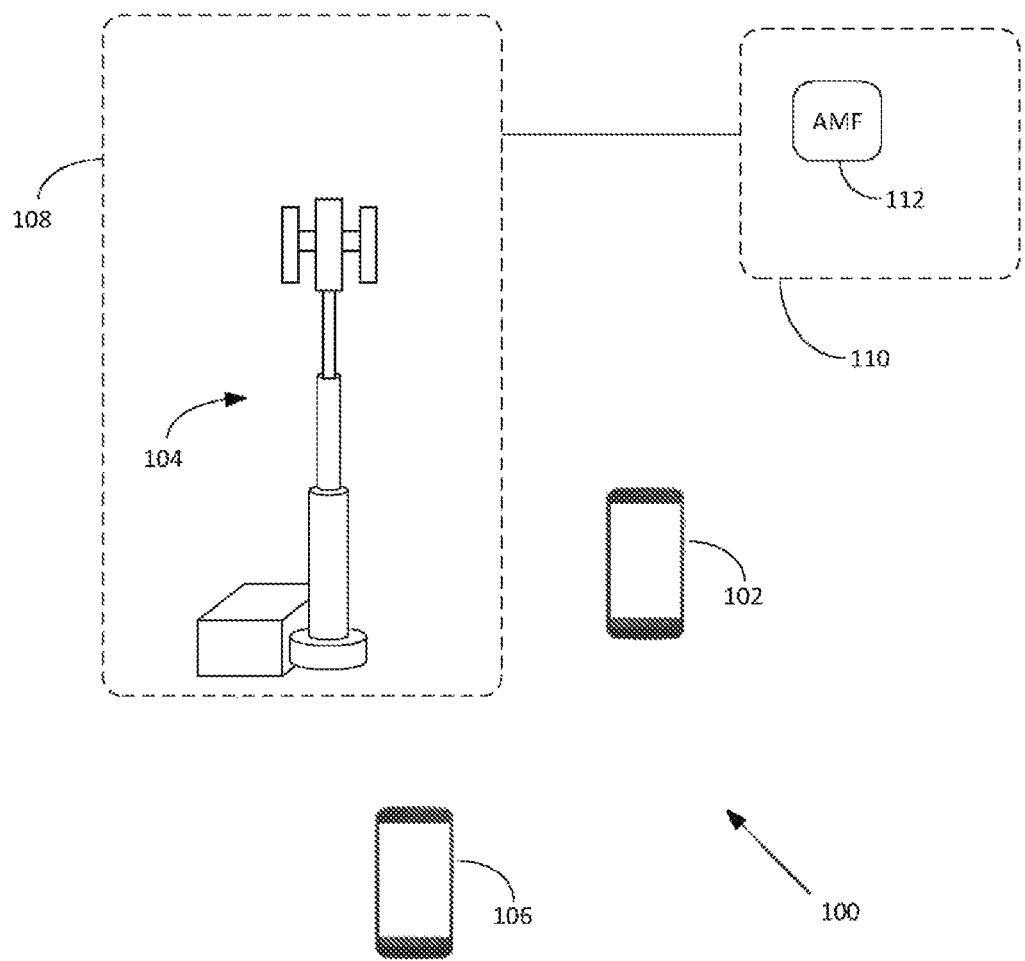
FIG. 1 is a diagram of a system in which various embodiments of the disclosure are implemented.

FIG. 1 depicts a communication system 100 in which the various embodiments described herein may be implemented. The communication system 100 includes several wireless communication devices ("wireless communication device" will sometimes be shortened herein to "communication device" or "device" for convenient reference). The communication devices depicted are a first communication device 102 (depicted as a user equipment ("UE")), a second communication device 104 (depicted as a base station), and a third communication device 106 (depicted as a UE). It is to be understood that there may be many other communication devices and that the ones represented in FIG. 1 are meant only for the sake of example. In an embodiment, the wireless communication system 100 has many other components that are not depicted in FIG. 1, including other base stations, other UEs, wireless infrastructure, wired infrastructure, and other devices commonly found in wireless networks. Possible implementations of the communication devices include any device capable of wireless communication, such as a smartphone, tablet, laptop computer, and non-traditional devices (e.g., household appliances or other parts of the "Internet of Things"). When operating as part of a wireless communication system (e.g., part of a radio access network), a wireless communication device may be referred to as a "wireless network node." A wireless communication device communicates primarily by transmitting and receiving wireless signals.

The second communication device 104 operates as a node of a RAN (such as a "Node B" of a fourth generation or fifth generation RAN) 108. The RAN 108 is communicatively linked to a CN 110. The CN 110 carries are many functions in support of the RAN 108 and has many components, including an Access and Mobility Management Function ("AMF") 112. It is to be understood that the "function" carried out by the AMF 112 is, in fact, carried out by one or more actual computing devices (e.g., under the control of software). Thus, all references herein to an AMF are to be understood as being references to a piece of computer hardware (e.g., one or more computing devices).

The following description will sometimes refer to a node and a UE without specific reference to FIG. 1. It is to be understood, however, that all of the methods described herein may be carried out by the communication devices of FIG. 1, and that references to a node, base station, and UE in a general manner are merely for convenience. Also, for each of the procedures described, in an embodiment, the steps are carried out in the order that the language sets forth. In other embodiments, the steps are carried out in different orders.

Figure 2:
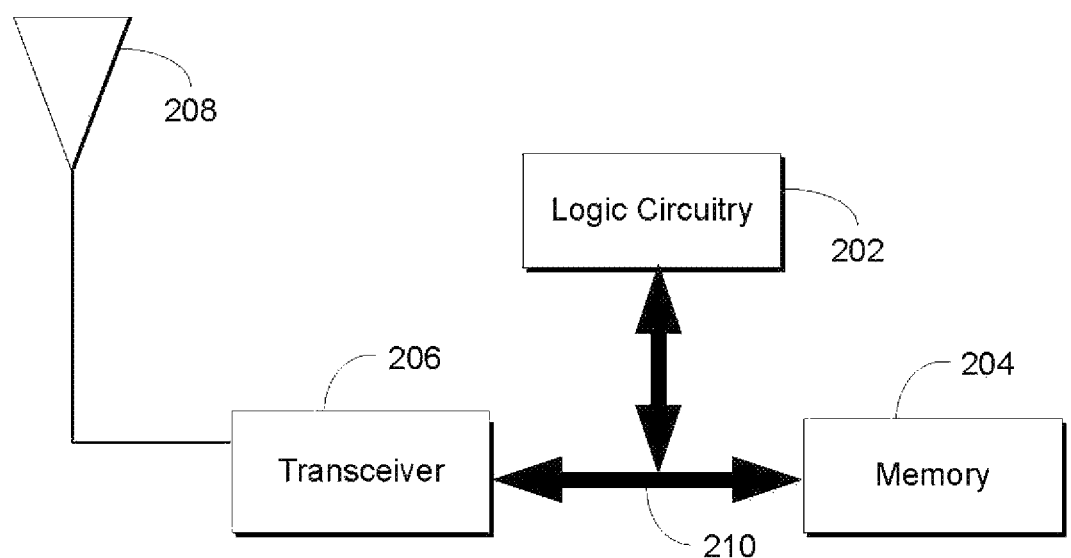
FIG. 2 shows an example hardware architecture of a communication device.

FIG. 2 illustrates a basic hardware architecture implemented by each of the wireless communication devices of FIG. 1, including the AMF 112, according to an embodiment. The elements of FIG. 1 may have other components as well. The hardware architecture depicted in FIG. 2 includes logic circuitry 202, memory 204, transceiver 206, and one or more antennas represented by antenna 208 (including transmit antennas and/or receive antennas). The memory 204 may be or include a buffer that, for example, holds incoming transmissions until the logic circuitry is able to process the transmission. Each of these elements is communicatively linked to one another via one or more data pathways 210. Examples of data pathways include wires, conductive pathways on a microchip, and wireless connections. The hardware architecture of FIG. 2 may also be referred to herein as a "computing device."

The term "logic circuitry" as used herein means a circuit (a type of electronic hardware) designed to perform complex functions defined in terms of mathematical logic. Examples of logic circuitry include a microprocessor, a controller, or an application-specific integrated circuit. Where the present disclosure refers to a device carrying out an action, it is to be understood that this can also mean that logic circuitry integrated with the device is, in fact, carrying out the action.

In many existing wireless networks, an RRC connection request is used to deliver the temporary UE ID to network node, which the network node uses for contention resolution. The RRC connection request is sent over signaling radio bearer 0 ("SRB0") using the uplink ("UL") common control channel ("CCCH"), i.e., random access message 3 ("MSG3"). Because SRB0 uses radio link control ("RLC") transparent mode ("TM") and hence lacks segmentation, the whole RRC protocol data unit ("PDU") needs to be sent within a single transport block, which limits its size. The size of the transport block is determined by the number of bits that can be reliably delivered to a UE at the cell edge, and can be as low as 56 bits in some deployments. After removing the media access control ("MAC"), RLC, and the packet data convergence protocol ("PDCP") overhead, only 48 bits remain for the actual RRC PDU.

It has been proposed to extend the temporary UE ID to 48 bits. With such an extension, the temporary UE ID will not fit within MSG3, particularly because other elements need to be transmitted in the RRC connection request (e.g., the establishment cause).

In some recent versions of long-term evolution ("LTE") networks, the RRC "resume" process uses a truncated version of the Resume ID to fit into a 56-bit MSG3. The Truncated Resume ID impacts performance because it reduces the number of connections that can be suspended per the base station and the area in which a connection can be resumed.

In order to address this issue, in an embodiment, a temporary identifier for a wireless communication device (e.g., a UE) is divided into two parts. The wireless communication device ("device") transmits the first part ("first portion") via RRC Connection Request message. The device transmits the second part ("second portion") via RRC Connection Setup Complete message. Although examples of particular sizes for the first and second portions have been set forth herein, it is to be understood that other sizes may also be used.

Figure 3A:
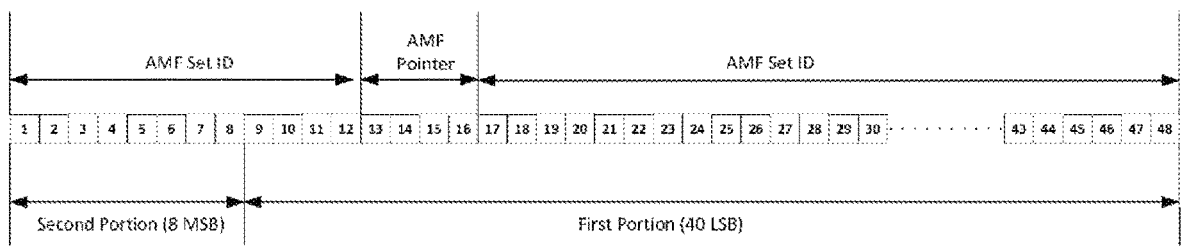
FIG. 3A and FIG. 3B are examples of possible structures of a temporary identifier.

Turning to FIG. 3A, an example of a temporary identifier (e.g., fifth generation system architecture evolution TMSI ("5G-S-TMSI")) configured according to an embodiment is shown. In this example, the temporary identifier has the following structure:

<5G-S-TMSI>=<AMF Set ID><AMF Pointer><5G-TMSI> where the AMF Set ID is 12 bits in length,
the AMF Pointer is 4 bits in length,
and the 5G-TMSI is 32 bits in length.

In this embodiment, the temporary identifier (e.g., the 5G-S-TMSI) is divided into two parts: the 40 least significant bits ("LSB") and the 8 most significant bits ("MSB"). The wireless communication device transmits the 40 LSB via an RRC Connection Request message. The 40 LSB transmitted in the RRC Connection Request message include:

<5G-TMSI>: 32 bits
<AMF Pointer>: 4 bits
<AMF Set ID>: 4 LSB

For initial access, the 40 LSB can be used (e.g., by the RAN) for contention resolution.

The wireless communication device (e.g., UE) transmits the 8 MSB bits of the temporary identifier via an RRC Connection Setup Complete message. The 8 MSB transmitted in the RRC Connection Setup Complete message include:

<AMF Set ID>: 8 MSB

Figure 3B:
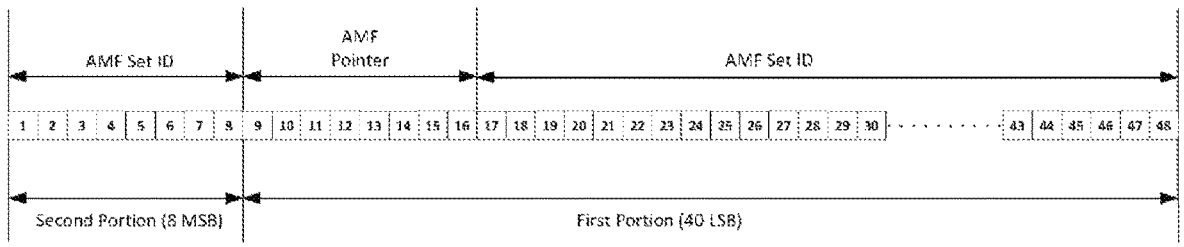

Turning to FIG. 3B, an example of a temporary identifier (e.g., 5G-S-TMSI) configured according to an embodiment is shown. In this example, the temporary identifier has the following structure:

<5G-S-TMSI>=<AMF Set ID><AMF Pointer><5G-TMSI> where the AMF Set ID is 8 bits in length,
the AMF Pointer is 8 bits in length,
and the 5G-TMSI is 32 bits in length.

In this embodiment, the wireless communication device transmits the 40 LSB in the RRC Connection Request message. The 40 LSB include:

<5G-TMSI>: 32 bits
<AMF Pointer>: 8 bits

The wireless communication device transmits the 8 MSB of the temporary identifier via an RRC Connection Setup Complete message. The 8 MSB transmitted in RRC Connection Setup Complete message in this embodiment include:

<AMF Set ID>: 8 bits

As in the previously described embodiment, the 40 LSB of the temporary identifier can be used (e.g., by the RAN) for contention resolution.

Figure 4:
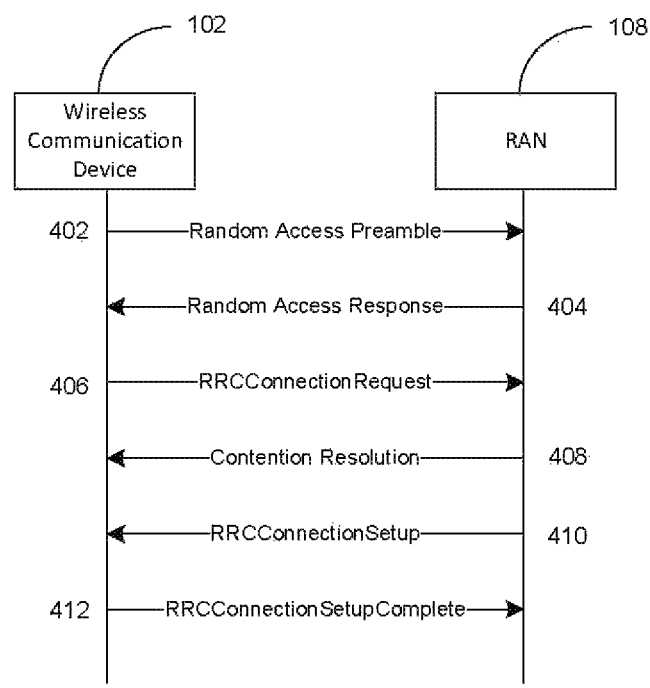
FIG. 4 is a communication flow diagram of a procedure for transmitting and receiving a temporary identifier, according to an embodiment.

Turning to FIG. 4, an example of an initial access procedure carried out according to an embodiment will now be described.

At 402, the wireless communication device 102 transmits a Random Access Preamble on a random access channel ("RACH") in a UL transmission to the RAN 108 (e.g., via a node of the RAN 108, such as the wireless communication device 104).

At 404, the RAN 108 transmits a Random Access Response (e.g., transmitted via the MAC layer and on the downlink shared channel ("DL-SCH")) to the wireless communication device 102.

At 406, the wireless communication device 102 transmits on the first scheduled UL transmission on the uplink shared channel ("UL-SCH") to the RAN 108. The transmission includes the RRC Connection Request (e.g., generated by the wireless communication device 102 at the RRC layer and transmitted via the CCCH). The RRC Connection Request includes the 40 LSB of the temporary identifier (e.g., of the 5G-S-TMSI, including the 32-bit 5G-TMSI and the 8-bit AMF Pointer (if using the implementation of FIG. 3B) or the 4-bit AMF pointer and 4 bits of the AMF Set ID (if using the implementation of FIG. 3A)) and an establishment cause.

At 408, the RAN 108 transmits a Contention Resolution to the wireless communication device 102 on the downlink ("DL"). It should be noted that a hybrid automatic repeat request ("HARQ") feedback is only transmitted by the wireless communication device 102 (e.g., UE) if it detects its own identity (i.e., in the 40 LSB of the temporary identifier), as provided in the RRC Connection Request message, echoed in the Contention Resolution message.

At 410, the RAN 108 establishes signaling radio bearer 1 ("SRB1") by transmitting an RRC Connection Setup message to the wireless communication device 102.

At 412 the wireless communication device 102 confirms the successful completion of the establishment of an RRC connection. The wireless communication device 102 does so by transmitting an RRC Connection Setup Complete message via a dedicated control channel ("DCCH") to transfer the initial non-access stratum ("NAS") dedicated information/message to the RAN 108. The RRC Connection Setup Complete message includes the 8 MSB of the temporary identifier (e.g., of the 5G-S-TMSI) (which include the AMF Set ID, if using the implementation of FIG. 3B, or the remaining 8 bits of the AMF Set ID, if using the implementation of FIG. 3A).

After transmission of Connection Setup Complete message, the wireless communication device 102 transmits the entire temporary identifier to the RAN 108, providing an unambiguous identification of the wireless communication device and allowing the identification of the AMF (e.g., the AMF 112) and the network (e.g., the RAN 108). It can be used by the network and the wireless communication device to establish the identity of the device during signaling between them.

According to another embodiment, a wireless communication device (e.g., UE) provides a temporary identifier as follows: the device (a) transmits a random value (e.g., for contention resolution) to the RAN (e.g., via a CCCH message. such as an RRC Connection Request), and (b) subsequently transmits the entire temporary identifier (e.g., the 5G-S-TMSI) to the RAN (e.g., via a DCCH message, such as an RRC Connection Setup Complete message).

According to an embodiment, when the size of the temporary identifier (e.g., 5G-S-TMSI) is larger than 40 bits, the wireless communication device transmits a 40-bit random value via an RRC Connection Request message for contention resolution. Then, the wireless communication device transmits the entire temporary identifier (e.g., the 5G-S-TMSI) to the RAN via an RRC Connection Setup Complete message.

Regardless of the temporary identifier size, in various embodiments, the wireless communication device transmits a random value via an RRC Connection Request message for contention resolution. Then, the wireless communication device transmits the entire temporary identifier (e.g., the 5G-S-TMSI) to the RAN via an RRC Connection Setup Complete message.

Referring again to FIG. 4, in an embodiment, a procedure for providing a temporary identifier is as follows.

At 402, the wireless communication device 102 transmits a Random Access Preamble on a RACH in a UL transmission to the RAN 108 (e.g., via a node of the RAN 108, such as the wireless communication device 104).

At 404, the RAN 108 transmits a Random Access Response (e.g., transmitted via the MAC layer and on the DL-SCH) to the wireless communication device 102.

At 406, the wireless communication device 102 transmits on the first scheduled UL transmission on the UL-SCH to the RAN 108. The transmission includes the RRC Connection Request (e.g., generated by the wireless communication device 102 at the RRC layer and transmitted via the CCCH). The RRC Connection Request includes a 40-bit random value and an establishment cause. The 40-bit random value will be used as an identifier for the wireless communication device 102 for contention resolution.

At 408, the RAN 108 transmits a Contention Resolution to the wireless communication device 102 on DL. It should be noted that a HARQ feedback is only transmitted by the wireless communication device 102 (e.g., UE) if it detects its own identity (i.e., in the 40-bit random value), as provided in the RRC Connection Request message, echoed in the Contention Resolution message.

At 410, the RAN 108 establishes signaling radio bearer 1 ("SRB1") by transmitting an RRC Connection Setup message to the wireless communication device 102.

At 412 the wireless communication device 102 confirms the successful completion of the establishment of an RRC connection. The wireless communication device 102 does so by transmitting an RRC Connection Setup Complete message via the DCCH to transfer the initial NAS dedicated information/message to the RAN 108. The RRC Connection Setup Complete message includes the entire temporary identifier (e.g., the entire 5G-S-TMSI).

After transmission of Connection Setup Complete message, the wireless communication device 102 transmits the entire temporary identifier to the RAN 108, providing an unambiguous identification of the wireless communication device and allowing the identification of the AMF (e.g., the AMF 112) and the network (e.g., the RAN 108). It can be used by the network and the wireless communication device to establish the identity of the device during signaling between them.

Any and all of the methods described herein are carried out by or on one or more computing devices. Furthermore, instructions for carrying out any or all of the methods described herein may be stored on a non-transitory, computer-readable medium, such as any of the various types of memory described herein.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the various methods can be reordered in ways that will be apparent to those of skill in the art.

What is claimed is:

1. A method for Fifth-Generation (5G) wireless communication, comprising:

transmitting, by a wireless communication device, a first portion of a temporary identifier of the wireless communication device to a radio access network in a radio resource control connection request message, wherein the first portion is a plurality of least significant bits of the temporary identifier, and wherein the temporary identifier comprises a temporary mobile subscriber identity (TMSI), an access and mobility management function pointer, and an access and mobility management function set identifier, and wherein the temporary identifier is a 5G-S-TMSI; and transmitting, by the wireless communication device, a second portion of the temporary identifier to the radio access network in a radio resource control connection setup complete message, wherein the second portion is a plurality of most significant bits of the temporary identifier, wherein the method further comprising receiving, from the radio access network, a common control channel message including the first portion.

2. The method of claim 1, wherein the temporary mobile subscriber identity (TMSI) is a 5G-TMSI of 32 bit length.

3. The method of claim 1, wherein the temporary identifier is represented as <5G-S-TMSI>=<AMF Set ID><AMF Pointer><5G-TMSI>.

4. A method for Fifth-Generation (5G) wireless communication, comprising:

receiving, by a node in a radio access network, in a radio resource control connection request message from a wireless communication device, a first portion of a temporary identifier of the wireless communication device, wherein the first portion is a plurality of least significant bits of the temporary identifier, and wherein the temporary identifier comprises a temporary mobile subscriber identity (TMSI), an access and mobility management function pointer, and an access and mobility management function set identifier, and wherein the temporary identifier is a 5G-S-TMSI; and receiving, by the node, in a radio resource control connection setup complete message from the wireless communication device, a second portion of the temporary identifier, wherein the second portion is a plurality of most significant bits of the temporary identifier, wherein the method further comprises transmitting, to the wireless communication device, a common control channel message including the first portion.

5. The method of claim 4, wherein the temporary mobile subscriber identity (TMSI) is a 5G-TMSI of 32 bit length.

6. The method of claim 4, wherein the temporary identifier is represented as <5G-S-TMSI>=<AMF Set ID><AMF Pointer><5G-TMSI>.

7. An apparatus for Fifth-Generation (5G) wireless communication, comprising:

a processor; and a memory including processor executable code, wherein the processor executable code upon execution by the processor configures the processor to:

transmit a first portion of a temporary identifier of the apparatus to a radio access network in a radio resource control connection request message, wherein the first portion is a plurality of least significant bits of the temporary identifier, and wherein the temporary identifier comprises a temporary mobile subscriber identity (TMSI), an access and mobility management function pointer, and an access and mobility management function set identifier, and wherein the temporary identifier is a 5G-S-TMSI; and transmit a second portion of the temporary identifier to the radio access network in a radio resource control connection setup complete message, wherein the second portion is a plurality of most significant bits of the temporary identifier, wherein the processor is further configured to receive, from the radio access network, a common control channel message including the first portion.

8. The apparatus of claim 7, wherein the temporary mobile subscriber identity (TMSI) is a 5G-TMSI of 32 bit length.

9. The apparatus of claim 7, wherein the temporary identifier is represented as <5G-S-TMSI>=<AMF Set ID><AMF Pointer><5G-TMSI>.

10. An apparatus for Fifth-Generation (5G) wireless communication, comprising:

a processor; and a memory including processor executable code, wherein the processor executable code upon execution by the processor configures the processor to:

receive, in a radio resource control connection request message from a wireless communication device, a first portion of a temporary identifier of the wireless communication device, wherein the first portion is a plurality of least significant bits of the temporary identifier, and wherein the temporary identifier comprises a temporary mobile subscriber identity (TMSI), an access and mobility management function pointer, and an access and mobility management function set identifier, and wherein the temporary identifier is a 5G-S-TMSI; and receive, in a radio resource control connection setup complete message from the wireless communication device, a second portion of the temporary identifier, wherein the second portion is a plurality of most significant bits of the temporary identifier, wherein the processor is configured to transmit, to the wireless communication device, a common control channel message including the first portion.

11. The apparatus of claim 10, wherein the temporary mobile subscriber identity (TMSI) is a 5G-TMSI of 32 bit length.

12. The apparatus of claim 10, wherein the temporary identifier is represented as <5G-S-TMSI>=<AMF Set ID><AMF Pointer><5G-TMSI>.

* * * * *